US006945515B2

(12) United States Patent
Diggle, III et al.

(10) Patent No.: US 6,945,515 B2
(45) Date of Patent: Sep. 20, 2005

(54) FISH TAPE GUIDE AND METHOD OF USING SAME

(75) Inventors: Frederick James Diggle, III, Birmingham, AL (US); Steven Ryals, Pinson, AL (US)

(73) Assignee: BellSouth Intellectual Property Corporation, Atlanta, GA (US)

( * ) Notice: Subject to any disclaimer, the term of this patent is extended or adjusted under 35 U.S.C. 154(b) by 0 days.

(21) Appl. No.: 10/774,249

(22) Filed: Feb. 6, 2004

(65) Prior Publication Data

US 2005/0173686 A1 Aug. 11, 2005

(51) Int. Cl.⁷ ................................................ B66F 3/00
(52) U.S. Cl. .......................... 254/134.3 FT; 254/234.4
(58) Field of Search ................ 254/134.3 R, 134.3 FT, 254/134.4

(56) References Cited

U.S. PATENT DOCUMENTS

| | | | |
|---|---|---|---|
| 382,257 A * | 5/1888 | Geyser ..................... | 254/134.4 |
| 1,036,114 A * | 8/1912 | Hodgman ................. | 254/134.4 |
| 4,498,659 A * | 2/1985 | Brockelsby, III ........ | 254/134.4 |
| 4,939,821 A | 7/1990 | Frank, Jr. | |
| 5,050,273 A | 9/1991 | Okura | |
| 5,054,667 A | 10/1991 | Levy et al. | |
| 5,121,644 A * | 6/1992 | Grey et al. ................ | 73/865.9 |
| 5,142,745 A | 9/1992 | Setty et al. | |
| 5,906,357 A * | 5/1999 | Munson, Sr. ............ | 254/134.4 |
| 6,581,251 B2 | 6/2003 | Malin | |

OTHER PUBLICATIONS

U.S. Appl. No. 10/387,022, filed Mar. 12, 2003.
U.S. Appl. No. 10/786,733, filed Feb. 25, 2004.
U.S. Appl. No. 10/786,734, filed Feb. 25, 2004.
Product Search Drop Hardware, Internet Catalog, viewed on Jun. 1, 2004, Senior Industries, cited at http://www.seniorindustries.com.
Durable PE Shuttlecock, Internet Catalog, viewed on Jun. 2, 2004, Nan Yun Sporting Goods Co., Ltd./Jex Trading Co., Ltd., cited at http://www.allproducts.com.

* cited by examiner

*Primary Examiner*—Lee D. Wilson
(74) *Attorney, Agent, or Firm*—Lee & Hayes, PLLC

(57) ABSTRACT

An apparatus for guiding fish tape through a conduit includes a rounded head having an abutting end, a stabilizing skirt and an attachment mechanism. The stabilizing skirt is attached to the rounded head at the abutting end of the rounded head. In addition, the attachment mechanism is connected to the rounded head within the stabilizing skirt.

11 Claims, 3 Drawing Sheets

FISH TAPE GUIDE AND METHOD OF USING SAME

BACKGROUND

The subject invention generally and in various embodiments relates to devices and methods for guiding fish tape, and more particularly to devices capable of guiding a fish tape through raceways and methods of using those devices.

Electricians or technicians are often required to install a run of line or wire through lengths of conduit. A fish tape is commonly sent through the conduit for installing the run of line or wire. Often, the fish tape is first sent through the conduit and then the line or wire is attached. The fish tape is pulled back out of the conduit with the line or wire attached, thus installing the line or wire (e.g., electrical or communication wire) with the fish tape being removed. Often the conduit will have angled bends (e.g., 90 degree bends, etc.) and may already have runs of wire inside the conduit. Running a fish tape through conduit with wires currently installed may cause the wires to become damaged by the rough edges of the fish tape. It is sometimes a challenge to circumvent these obstacles and deviations in the conduit for proper installation of a run of line or wire through lengths of conduit.

SUMMARY

Various embodiments of the present invention include an apparatus for guiding fish tape through a conduit. The apparatus includes a rounded head having an abutting end, a stabilizing skirt and an attachment mechanism. The stabilizing skirt is attached to the rounded head at the abutting end of the rounded head. In addition the attachment mechanism is connected to the rounded head within the stabilizing skirt.

Various embodiments of the present invention include a method for guiding fish tape. The method includes affixing the fish tape to a fish tape guide that has an attachment mechanism attached to a rounded head and positioned within a stabilizing skirt. The method also includes positioning the fish tape guide into the conduit such that the rounded head is directed forward and then pushing the fish tape through the conduit.

Other systems, methods, and/or products according to embodiments will be or become apparent to one with skill in the art upon review of the following drawings and detailed description. It is intended that all such additional systems, methods, and/or products be included within this description, be within the scope of the present invention, and be protected by the accompanying claims.

BRIEF DESCRIPTION OF THE DRAWINGS

In the accompanying Figures, there are shown various embodiments of the invention wherein like reference numerals are employed to designate like parts and wherein.

DETAILED DESCRIPTION

Figure 1:
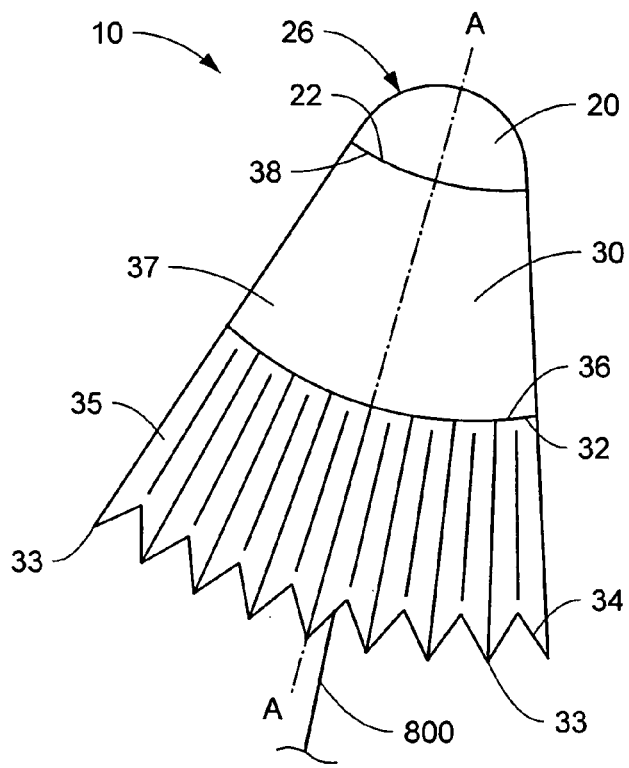
FIG. 1 is a side view of a fish tape guide apparatus according to various embodiments of the invention.

Referring now to the drawings for the purpose of illustrating the invention and not for the purpose of limiting the same, it is to be understood that standard components or features that are within the purview of an artisan of ordinary skill and do not contribute to the understanding of the various embodiments of the invention are omitted from the drawings to enhance clarity. In addition, it will be appreciated that the characterizations of various components and orientations described herein as being "vertical" or "horizontal", "right" or "left", "side", "top", "bottom", "upper" or "lower" are relative characterizations only based upon the particular position or orientation of a given component for a particular application.

FIGS. 1–4 depict various embodiments of a guide 10 for fish tape 800 that may be used by, for example, a technician or an electrician (not shown). As shown in the cross-sectional views of FIGS. 2 and 4, the guide 10 has a rounded head 20 that has an abutting end 22. The guide 10 also has a stabilizing skirt 30 attached to the rounded head 20 at the abutting end 22. In addition, the guide 10 has an attachment mechanism 40 connected to the rounded head 20 within the stabilizing skirt 30.

The rounded head 20 is illustrated in FIGS. 1–4 as having the shape of a hemisphere. This shape assists the guide 10 in negotiating bends and/or obstacles in a conduit 900. See FIG. 5. However, other rounded shapes may be utilized for the rounded head 20 such as, for example, a spherical cap, a hemispheroid, etc. Further, the rounded head 20 has a smooth outer surface 26. The smooth outer surface 26 permits the guide 10 to negotiate the fish tape 800 through the conduit 900 with reduced friction between the rounded head 20 and the conduit 900. See FIG. 5.

As shown in FIGS. 1–4, the rounded head 20 and the stabilizing skirt 30 are attached to one another at the abutting end 22. The rounded head 20 and the stabilizing skirt 30 abut to make the same surface where they attach to one another. Thus, as illustrated, the rounded head 20 and the stabilizing skirt 30 coterminously abut one another at the abutting end 22. This abutment may prevent debris or snags that may affect the traveling of the guide 10 through the conduit 900. See FIG. 5.

Figure 2A:
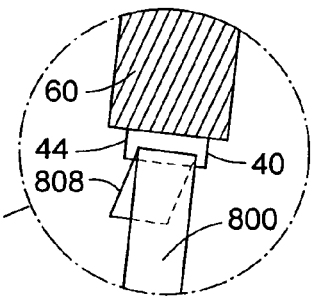
FIG. 2A is an enlarged view of a portion of the apparatus of FIG. 2.
Figure 2:
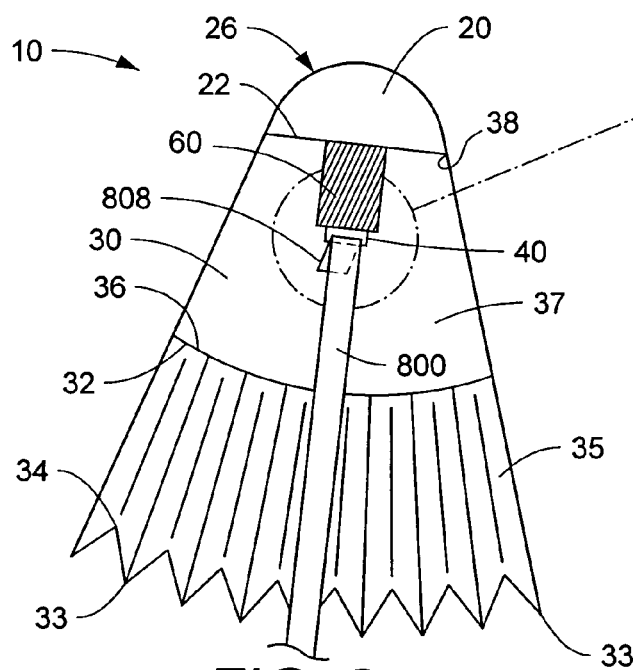
FIG. 2 is a cross-sectional view of the apparatus of FIG. 1 about the A—A axis.
Figure 3:
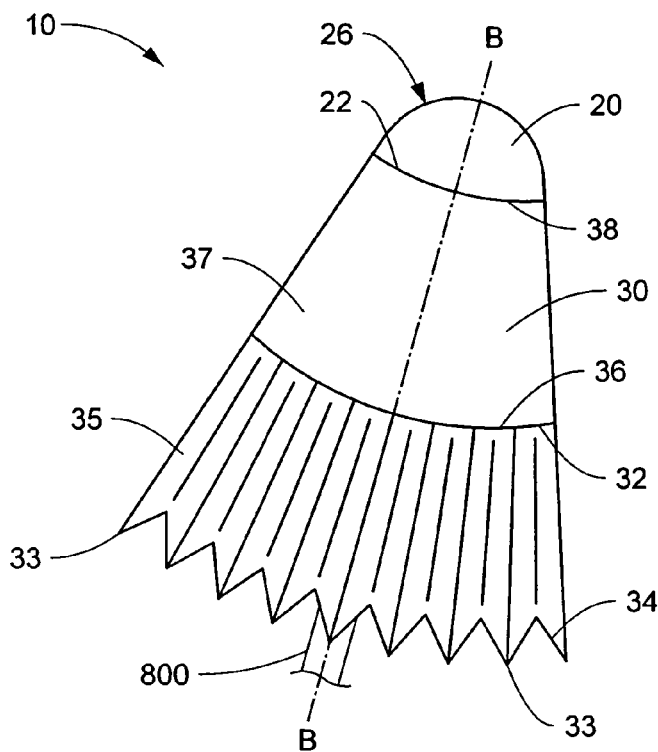
FIG. 3 is a front view of the apparatus of FIG. 1.
Figure 4:
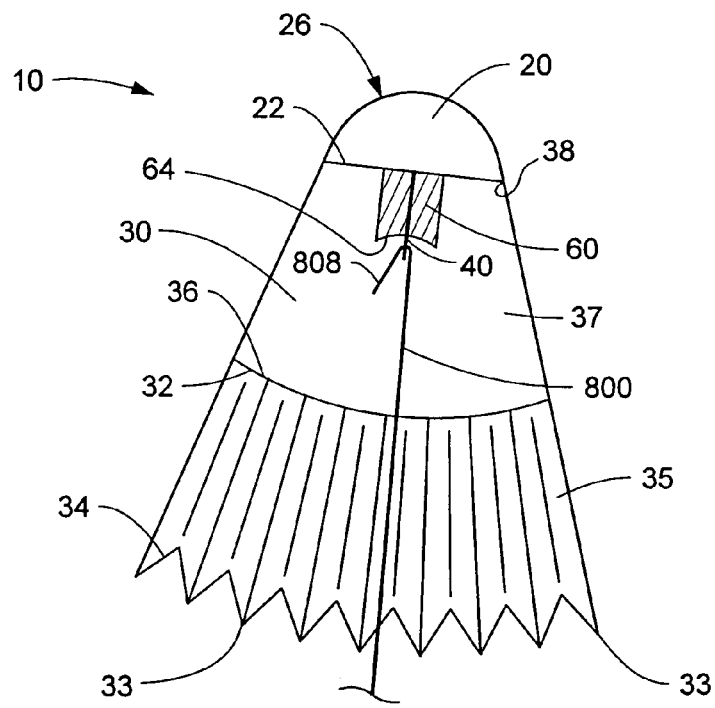
FIG. 4 is a cross-sectional view of the apparatus of FIG. 3 about the B—B axis.

In various embodiments, the stabilizing skirt 30 is resilient and generally forms a hollowed structure as can be seen in FIGS. 2 and 4. The stabilizing skirt 30 has a feathered portion 35. The feathered portion 35 has a wide end 34 and a narrow end 32. As shown, the wide end 34 is on an opposite side of the feathered portion 35 from the narrow end 32. The narrow end 32 is generally depicted as having a circular shape although other shapes may be used. Further, the feathered portion 35 is resilient and may be constructed of various resilient materials such as, for example, plastic, rubber, etc.

Figure 5:
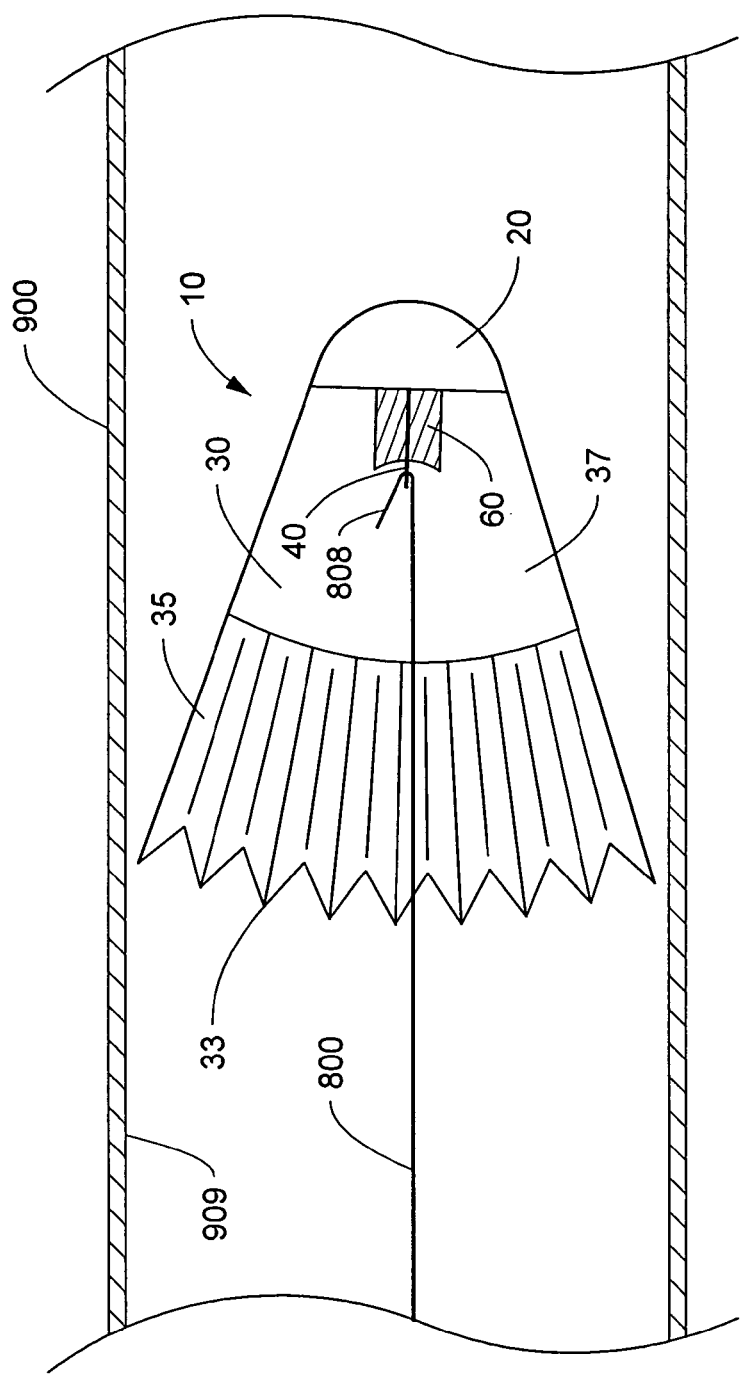
FIG. 5 is a cross-sectional view of a conduit further illustrating the apparatus as shown in FIG. 4.

Feathered portion 35 further has contiguous protrusions 33 at the wide end 34. As can be seen in FIG. 5, the contiguous protrusions 33 are also resilient and provide stabilizing support in the conduit 900. The stabilizing support is provided due to the contiguous protrusions 33 at the wide end 34 being sufficiently near an inner wall 900 of the conduit 900. Thus, the stabilizing skirt 30 stabilizes the guide 10 in a central portion of the conduit 900.

As shown in FIGS. 1–4, the stabilizing skirt 30 also has a frustoconical portion 37. The frustoconical portion 37 has a second wide end 36 and a second narrow end 38. The second wide end 36 is opposite the second narrow end 38, which both generally have a circular shape although other shapes may be used. As can be seen in the drawings, the narrow end 32 of the feathered portion 35 and the second wide end 36 of the frustoconical portion 37 correspond in shape and attach to one another. In addition, the frustoconical portion 37 is resilient as depicted in FIGS. 1–4.

In various embodiments, the rounded head 20 is attached to the frustoconical portion 37 at the abutting end 22 of the rounded head 20. The abutting end 22 of the rounded head is generally circular in shape. Thus, the abutting end 22 and the second narrow end 38 correspond in shape and attach to one another. The abutment also forms the same surface where the rounded head 20 attaches to the frustoconical portion 37.

The fish tape 800 is releasably securable to the attachment mechanism 40. The attachment mechanism 40 is illustrated as a loop member 44 where the fish tape 800 is releasably secured to the guide 10. See FIG. 2A. As can be seen in FIGS. 2, 2A and 4, the fish tape 800 is crimped across the loop member 44 forming a tab 808. Generally, tab 808 is long enough such that the fish tape 800 does not slip off of the loop member 44 when forced through the conduit 900. See FIG. 5. Thus, the attachment mechanism 40 allows the loop member 44 to releasably attach the fish tape 800 to the guide 10.

FIGS. 2, 2A and 4 illustrate the attachment mechanism 40 having a shock absorber 60. The shock absorber 60 is affixed to the rounded head 20 at the abutting end 22 within the stabilizing skirt 30. As shown, the loop member 44 attaches to the shock absorber 60 for releasably securing the fish tape 800. The shock absorber 60 is generally pliable and capable of returning to its original shape if deformed. Thus, the shock absorber 60 creates a buffer between the fish tape 800 and the rounded head 20 for absorbing forces applied from the fish tape 800.

A concave recess 64 is also provided in the shock absorber 60 facing the attachment mechanism 40, or loop member 44, as shown in FIG. 4. The concave recess 64 assists in preventing the fish tape 800 from slipping out of the loop member 44. Further, the concave recess 64 is configured to receive and absorb the force from the fish tape 800 along the crimped edge created by the tab 808. Thus, the fish tape 800 may be accommodated by the concave recess 64 by being received by the concave recess 64.

In various embodiments, the guide 10 guides the fish tape 800 through the conduit 900 as illustrated in FIG. 5. The fish tape 800 is affixed to the guide 10 at the attachment mechanism 40. The fish tape 800 may be affixed to the attachment mechanism 40 by crimping the fish tape 800 across the attachment mechanism 40 leaving the tab 808. The guide 10 is then positioned into the conduit 900 such that the rounded head 20 is directed forward. The fish tape 800 travels near the central portion of the conduit 900 by the contiguous protrusions 33 being sufficiently close to the inner wall 909 of the conduit to stabilize the guide 10 near the central portion of the conduit 900. The fish tape 800 is then pushed through the conduit 900 with the rounded head 20 directed forward.

While being pushed through the conduit 900, the fish tape 800 may encounter angles in the conduit 900 or other obstructions such as wire, for example. In this instance, the fish tape 800 can be twisted to reposition the leading rounded head 20 inside the conduit 900. This twisting assists in moving the rounded head 20 into a different position inside the conduit 900 so that the guide 10 can negotiate the fish tape 800 through the conduit 900.

As can be seen in the drawings, the fish tape guide has a cone-like, or frustoconical, appearance. It will be appreciated that other configurations will be within the spirit and scope of the invention for varying applications of conduit and that these particular configurations may lend themselves to simple construction. Other configurations include a somewhat complimentary shape to the conduit for the given application. Further, the fish tape guide may be reusable or disposable given the parameters that may define such a design such as, for example, costs to manufacture and durability of a specific embodiment.

Whereas particular embodiments of the invention have been described herein for the purpose of illustrating the invention and not for the purpose of limiting the same, it will be appreciated by those of ordinary skill in the art that numerous variations of the details, materials, configurations and arrangement of parts may be made within the principle and scope of the invention without departing from the spirit of the invention. The preceding description, therefore, is not meant to limit the scope of the invention.

What is claimed is:

1. An apparatus for guiding fish tape in a conduit, the apparatus comprising:
 a rounded head having an abutting end;
 a stabilizing skirt attached to the rounded head at the abutting end; and
 an attachment mechanism connected to the rounded head within the stabilizing skirt, the attachment mechanism further comprising a shock absorber affixed to the rounded head at the abutting end within the stabilizing skirt.

2. The apparatus of claim 1, wherein the rounded head is a hemisphere.

3. The apparatus of claim 1, wherein the rounded head has a smooth outer surface.

4. The apparatus of claim 1, wherein the rounded head and the stabilizing skirt coterminously abut one another at the abutting end.

5. The apparatus of claim 1, wherein the stabilizing skirt is resilient.

6. The apparatus of claim 1, wherein the stabilizing skirt has a feathered portion having a wide end opposite a narrow end.

7. The apparatus of claim 6, wherein the stabilizing skirt has a frustoconical portion having a second wide end opposite a second narrow end, the narrow end of the feathered portion and the second wide end correspond in shape and attach to one another.

8. The apparatus of claim 7, wherein the abutting end and the second narrow end correspond in shape and attach to one another.

9. The apparatus of claim 1, wherein the shock absorber is pliable.

10. The apparatus of claim 1, wherein the shock absorber extends from the abutting end of the rounded head within the stabilizing skirt.

11. The apparatus of claim 1, wherein the shock absorber has a concave recess facing the attachment mechanism.

* * * * *